United States Patent
Hanley (10) Patent No.: US 6,198,910 B1
(45) Date of Patent: Mar. 6, 2001

(54) CELLULAR NETWORK HAVING IMPROVED METHOD FOR MANAGING RF CHANNELS

(75) Inventor: Donald V. Hanley, McKinney, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/301,537

(22) Filed: Apr. 28, 1999

(51) Int. Cl.$^7$ .................................................. H04B 17/00
(52) U.S. Cl. .................... 455/67.1; 455/67.3; 455/67.7; 455/452; 455/436
(58) Field of Search ................................ 455/67.1, 450, 455/436, 437, 62, 522, 67.7, 452

(56) References Cited

U.S. PATENT DOCUMENTS

| | | | |
|---|---|---|---|
| 4,736,453 | * 4/1988 | Schloemer | ............................. 455/33 |
| 5,278,991 | 1/1994 | Ramsdale et al. . | |
| 5,491,837 | 2/1996 | Haartsen . | |
| 5,551,064 | 8/1996 | Nobbe et al. . | |
| 5,579,306 | 11/1996 | Dent . | |
| 5,581,548 | 12/1996 | Ugland et al. . | |
| 5,649,290 | 7/1997 | Wang . | |
| 5,659,544 | 8/1997 | La Porta et al. . | |

* cited by examiner

Primary Examiner—Edward F. Urban
Assistant Examiner—Blane J. Jackson
(74) Attorney, Agent, or Firm—Haynes and Boone, LLP (57) ABSTRACT

The present invention is a centralized RF management system that controls RF channels in a cellular network. An RF management system is provided that combines multiple parameters in a way to improve the overall quality of service offered to mobile subscribers, while at the same time greatly simplifying the operator's RF engineering activities. The present invention is based on a "Quality Map" or Q-Map of the system. The Q-Map identifies, for a particular mobile at a particular point in time, the estimated quality of service the mobile would receive on each available RF channel in each available mode (i.e. analog, digital) at each available power level. The Q-map is created and updated based on information available from the cellular system, including signal strength measurements, interference, call activity and so on. In addition, each mobile is assigned a quality value (Q-value) that reflects it current quality of service. When a mobile unit's Q-value falls below an operator defined threshold (Q-min), the mobile unit's current Q-map is searched for the highest channel/mode/power level combination. If that Q-map value is greater than the mobile units current Q-value, then the unit is instructed to take the appropriate action (handoff, change mode, change power level, or a combination of these), resulting in an improved quality of service for the mobile.

19 Claims, 9 Drawing Sheets

CELLULAR NETWORK HAVING IMPROVED METHOD FOR MANAGING RF CHANNELS

BACKGROUND OF THE INVENTION

1. Field of the Invention

The present invention relates to cellular networks and more particularly to management of radio frequency (RF) calls in a mobile telephone system.

2. Description of Related Art

In mobile telecommunication systems, an RF performance of the system is typically managed by responding to unacceptable signal characteristics and independently varying one of the RF management mechanisms. For instance, a system may respond to a poor carrier signal strength-to-interference (C/I) ratio of a call by increasing power. While, this power boost may strengthen the signal of the call being monitored, it may also have a corresponding negative affect on another call by increasing the interference in response to the higher noise levels caused by the higher power level. Another conventional RF management technique may be to switch a call from one channel frequency, with relatively high interference, to another channel with relatively low interference. Current RF management functions, however, are designed to operate independently and asynchronously. As a consequence, these RF management functions sometimes operate at cross-purposes, i.e., improving the signal of one mobile while increasing the interference experienced by other mobiles.

In addition, currently available RF management algorithms are essentially fixed in their behaviors, wherein decisions are based on configuration information and/or averaged measurements. As a result, RF management functions tend to have a large number of parameters which must be continually updated to maintain an optimum performance in the cellular network or telecommunication system. RF management algorithms are also typically associated with a variable parameter such as power level, call mode, and channel assignment. That is, one algorithm is used for power management while another manages channel allocation, and the like. RF management algorithms may also be coordinated to avoid significant interference in their respective operations. For example, handoff requests can be delayed until after power control actions have taken place, thus allowing time for the RF signal strength readings to settle. However, channel allocation, handoff and power control decisions are typically conducted in different places in a cellular network or telecommunications system, rather than at a centralized location, which makes coordinating activities difficult.

The effort to maintain and optimize RF management parameters in a cellular network can be reduced through the use of off-board management systems and expert systems. By analyzing past performance information received from a cellular system and comparing that information against a given set of rules, an expert system can determine when the system is getting "out of tune" and then recommend changes to the various parameters to correct the condition. In some cases, the expert system may also be able to make the changes itself. However, these expert systems utilize past average measured criteria and thus cannot make real-time decisions for specific mobile units to implement an appropriate dynamic corrective action. In addition, expert systems are highly complex, having an ability to crunch all the numbers and performance measurements to optimize performance. Such a system however requires undesired complexity. A more simpler solution is desired for handling RF channel allocation on a cellular network.

The problem in the art is further characterized in that management of the RF channels, particularly in terms of handoff, has become a very complicated and cumbersome process. The means used to decide whether or not a mobile should be assigned to a given channel or moved to a different channel has become a very complicated, large engineering problem. A lot of parameters are associated with the cell sites, in particular, to determine when particular mobiles need to be handoff and help decide where the mobiles need to go. It thus becomes difficult for operators of large networks to manage their system, and optimize behavior properly. This means that the quality over time begins to suffer. The operators are unable to keep up with the complexities of the system over time.

A need exists for a centralized RF management system that operates substantially synchronously across all variables for providing improved management of RF channels in a cellular network.

SUMMARY OF THE INVENTION

The present disclosure, accordingly, provides a method and apparatus for a centralized RF management system in a cellular network and operable in an analog and/or digital modes of operation which can include an analog advanced mobile phone system (AMPS), as well as a digital time division multiple access (TDMA) cellular network, or the like.

The RF management system and method combines multiple parameters in a manner to improve an overall quality of service offered to mobile subscribers, while at the same time greatly simplifying a cellular network operator's RF engineering activities. The end result is a cellular system with higher performance and lower operational costs.

The present invention is based on a "Quality Map" or Q-Map of the cellular system for each mobile thereof. The Q-Map identifies, for a particular mobile at a particular point in time during a call, the estimated quality of service the mobile would receive on each available RF channel in each available mode (i.e. analog, digital) at each available power level. The Q-map is created and updated based on information available from the cellular system, including signal strength measurements, interference, call activity and so on. In addition, each mobile is assigned a quality value (Q-value) that reflects it current quality of service.

When a mobile unit's Q-value falls below an operator defined threshold (Q-min) during a call, the mobile unit's current Q-map is searched for a prescribed channel/mode/power level combination. If that Q-map value is greater than the mobile units current Q-value, the unit is then instructed to take an appropriate action (handoff, change mode, change power level, or a combination of these), resulting in an improved quality of service for the mobile. The mobile's Q-map is updated to reflect the new situation and the quality assessment continues for the duration of the call.

The cellular network operator's optimization decision is simply to decide upon what value to set for the Q-min threshold. The Q-min threshold determines the minimum acceptable quality level for the system, thus allowing the operator flexibility to trade-off quality for resources.

DESCRIPTION OF THE PREFERRED EMBODIMENTS

Figure 1:
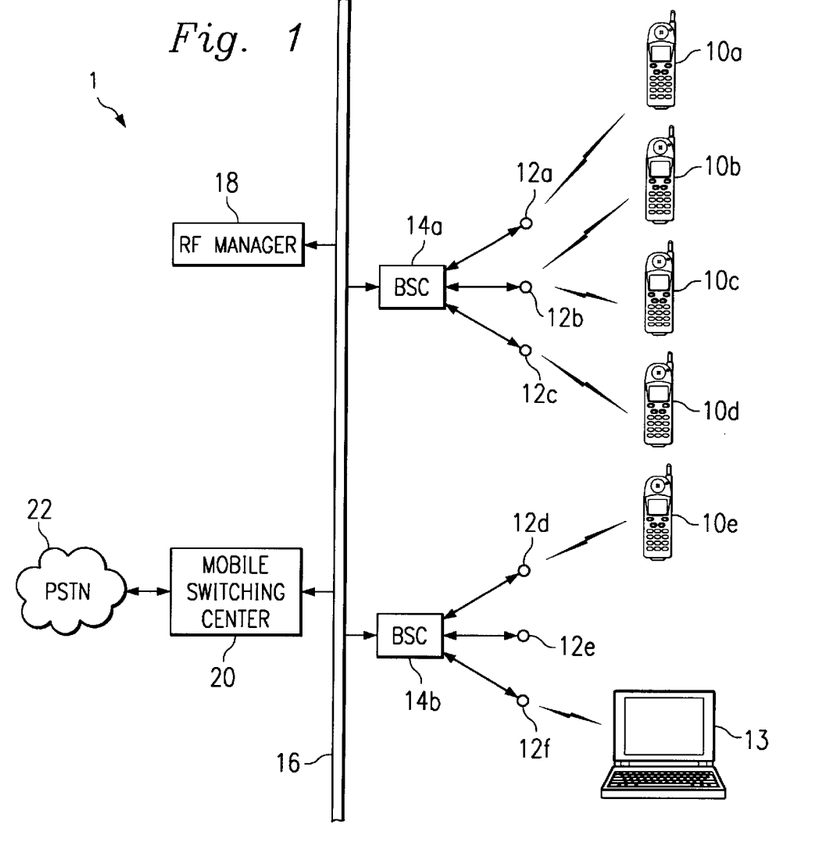
FIG. 1 is a block diagram view showing various components of a mobile telecommunication system or cellular network capable of implementing an embodiment of the present invention.

Referring to FIG. 1, a mobile telecommunications system is shown and generally designated by reference numeral 1. A plurality of mobile telephone units 10a, 10b, 10c, 10d and 10e are shown having a radio frequency (RF) communications link with one of a number of base transceiver stations (BTS) 12a, 12b, 12c, 12d, 12e, 12f. Of course, other types of mobile telecommunications systems, such as mobile computer 13 may also interface with the network through a RF link to one of the BTS' 12a–12f. It should be understood that FIG. 1 shows but one example of a mobile telecommunications system and many others are contemplated by the present invention.

Base transceivers 12 are coupled to base station controllers (BSC) 14a and 14b via a suitable data link, such as a land link, microwave link, satellite link, or other suitable link. BSCs 14a and 14b control the operation of their corresponding BTS stations 12a–12f. A suitable network interface, network connection, or bus 16 is provided to couple BSCs 14a and 14b with a mobile switching center (MSC) 20 that has overall responsibility for switching the various calls between mobile units 10, as well as between mobile units 10 and the public switched telephone network (PSTN) 22.

RF manager 18 is shown connected via network interface 16 and has visibility to all of the activity between mobile units 10, 13 and BTS 12a–12f. Thus, RF manager 18 is able to monitor the quality of the communications between the mobile units and base transceivers. Further, RF manager 18 can adjust various parameters of the RF links by sending various control signals to mobile units 10, 13 and BTS 12a–12f, via BSC 14a, 14b.

Figure 2:
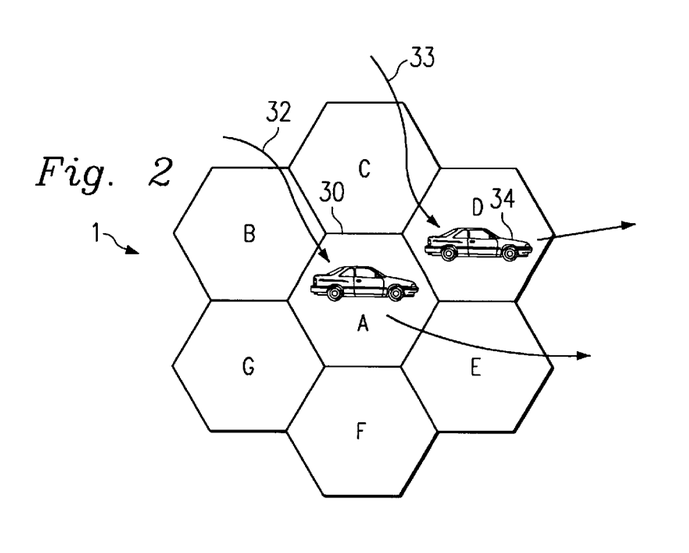
FIG. 2 is a schematic view of a cell structure in a mobile telecommunications network.

Referring now to FIG. 2, a cellular structure of mobile telecommunications system 1 is shown representing the area covered by a cellular system. Each of the cells A, B, C, D, E, F, G will have a BTS 12 (such as shown in FIG. 1) that provides RF communications links with the various mobile units in the area. An automobile 30 is shown that is traversing a path 32 through the cellular network. Inside automobile 30 a user may be placing, receiving or conducting a call to another mobile user or a land based user connected to PSTN 22 (FIG. 1). It can be understood from FIGS. 1 and 2 that during the movement of a mobile unit 10 from cell B to cell A to cell E, different BTS stations 12 will have responsibility for providing the RF communications to the mobile unit 10 in automobile 30. For example, a BTS in cell B will have initial responsibility, but as the automobile 30 approaches the transition to cell A, another BTS associated with cell A will likely need to take over RF communication responsibility. Another automobile 34 is shown in FIG. 2 that is also traveling through the cellular network. From FIGS. 1 and 2, it can be understood that at various points the automobiles 30 and 34 may be in close proximity to each other at certain cell boundary edges. That is, the automobiles could coincide at a given time along the C-A, D-A and D-E cell boundaries. If the automobile operators are both using their mobile telephones during this time, then it can be seen that, depending on the power level, channel assignment and the like, interference can be introduced into the communication link.

Normally, at cell boundary transition points the RF signal quality decreases. This is often due in part to the physical distance between the mobile unit and BTS, as well as other environmental factors such as the weather, buildings and other structures. The signal quality is affected by various parameters that correspond to the communication, such as signal strength, channel assignment and mode, i.e. analog or digital. In particular, interference by other mobile unit users can cause a detrimental affect on the carrier to interface ratio (i.e. C/I ratio) of other communications with respect to analog voice signals. In addition, digital-mode calls are generally assessed based on the bit error rate (BER), in comparison with the C/I ratio used for analog-mode calls. Interference of digitally coded voice signals can also be assessed via bit error rate (BER), frame error rate (FER), or other suitable measure.

As an example, one response to a decrease in signal quality may be to raise the signal strength of the transmission from the mobile unit. Another remedial measure is to raise the signal strength of the transmission from the base station to the mobile unit. It should be noted that merely increasing signal strength is not always the optimum solution since it may cause electrical noise, or interference to be increased with respect to other active mobiles. It can be seen that optimizing signal strength usually includes providing the minimum transmission power that is sufficient to maintain call quality, without providing excessive power.

Another parameter that may affect the quality of a communications link is the channel, or frequency, which is being used for the signal transmission. For example, cell A may be assigned one set of frequencies to be used to communicate with the mobile units in that area. Adjacent cell F may be assigned another set of frequencies. However, some of these frequencies may be overlapping, or at least close enough to cause one signal on a first channel to bleed over to another channel, thereby decreasing transmission quality.

The mode being used by the transmission is also a critical parameter for call quality. For instance, at low signal levels, analog signals are more resistant to interference than digital signals. That is, the quality of a digital signal sharply decreases when a certain interference level is encountered. On the other hand, an analog signal will have a relatively slow decrease in quality as more interference becomes present.

Each of the aforementioned parameters may have an affect on another parameter. For example, if the RF communication quality is low, then transmission power can be increased. However, this may have an adverse affect on the interference that is present on an adjacent channel. This potential increase in interference may also cause the quality of a digital transmission signal to be drastically reduced, while an analog signal may have a less noticeable quality loss.

Therefore, it can be seen that it is necessary to monitor all of the various parameters that affect the quality of the communications link and determine an optimum transmission power level, channel and mode for each call based upon a quality factor.

Figures 3, 4:
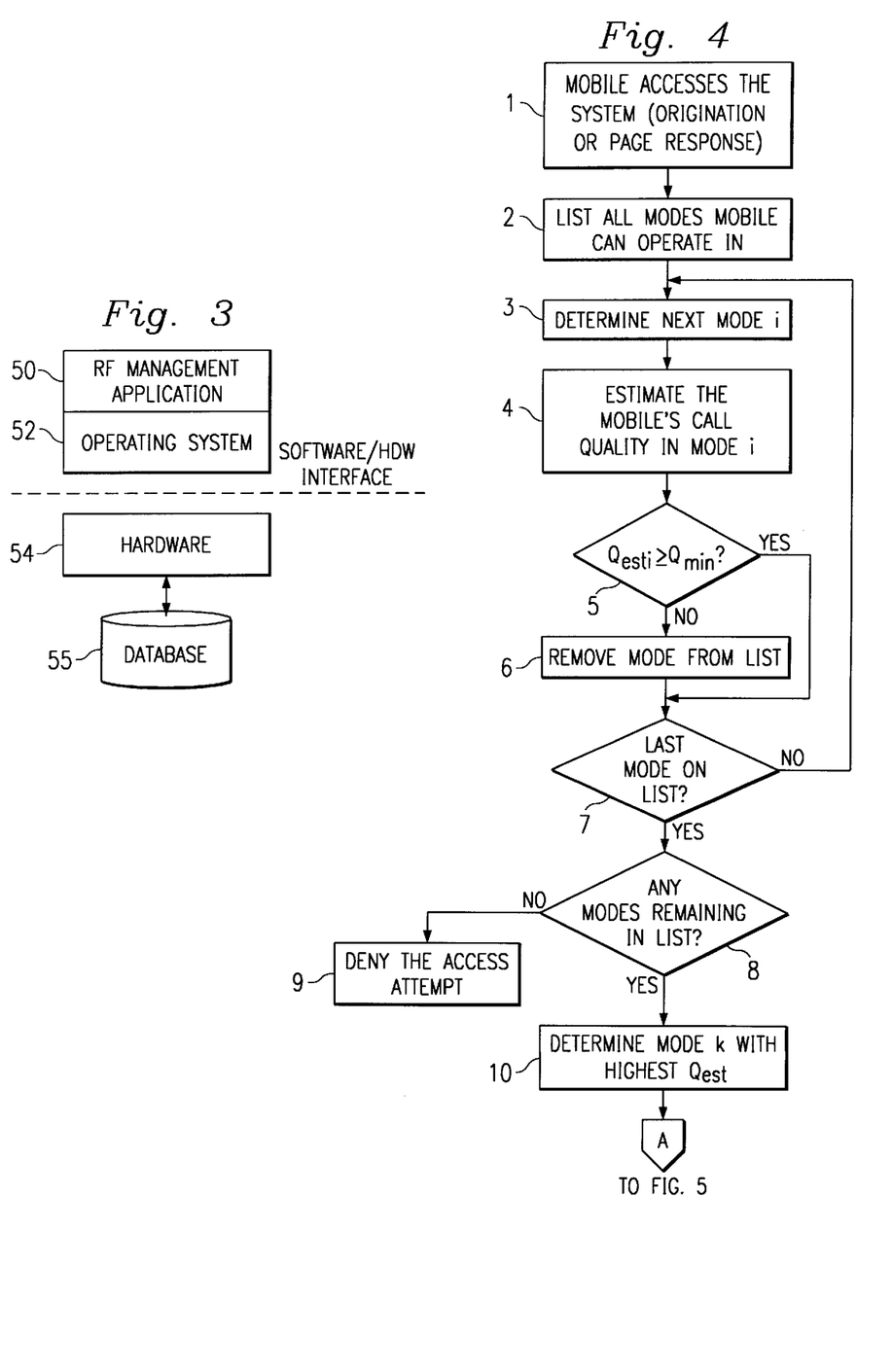
FIG. 3 is a block diagram showing the hardware and software elements that may be used to implement the RF manager in an embodiment of the present invention.
FIG. 4 is a flowchart of steps implemented by an embodiment of the present invention to determine a desired optimal mode for new calls in the mobile telecommunications system.

Turning now to FIG. 3, a diagram of the hardware and software components of the RF manager according to one embodiment of the present invention shall now be discussed. A workstation, such as an IBM RISC System/6000 running an AIX operating system, or the like, could be used to provide computing resources needed for the RF manager to control the various call parameters that affect quality.

The computer hardware 54 may include a central processing unit (CPU) or microprocessor that is coupled to other devices, for example, by a system bus. A database 55 is coupled to hardware 54 and stores values representative of the parameters affecting the quality of the RF communications. Those skilled in the art will readily comprehend how the computer hardware 54 interacts with the call parameters stored in database 55 by storing digital signals representative of the parameters and manipulating the signals using known digital signal processing techniques. Signals can then be transmitted by RF manager 18 in response to the processed digital values stored in database 55 to control the RF characteristics of the mobile telecommunications system 1.

RF management software can include the previously noted operating system 52 or other suitable operating system that is present and running on hardware 54. An RF manager application program 50 is running on operating system 52. The RF manager application program 50 includes various algorithms that manipulate the various call parameters and determine which combination of transmission power (by the mobile unit and the base station), channel allocation and mode will provide for an optimum quality based signal.

FIG. 4 is a flow chart of the steps implemented by an embodiment of the present invention to check the mode of new calls in the mobile telecommunications system and determine their quality levels. At step 1, a mobile unit 10 accesses the mobile telecommunications system 1 by originating a call, or in response to a page (receiving a call). The RF manager then lists all of the various modes that the mobile unit can operate under in step 2. As noted previously, there may be more than one mode that can be used for communications with the BTS, for example analog or one of the standard digital protocols (IS-136, EFRC or IS-54, VSELP) can be used.

The process then determines the next available operating mode for the mobile unit (step 3). The RF manager estimates the mobile units call quality (Q-est) for the next mode i at step 4. As noted previously, a Q-min, or the minimum acceptable quality threshold value has been determined or established by the cellular network operator.

Step 5 then determines if the estimated call quality Q-est is greater than or equal to the minimum call quality Q-min. If the estimated quality is not greater than or equal to the minimum quality, then the particular mode being evaluated is removed from the mode list at step 6. However, if the estimated quality does meet or exceed the minimum quality, then the process continues to step 7 where it is determined if this mode is the last one on the list. Subsequent to step 6 the process also continues to step 7. If the mode under consideration is not the last mode on the list (as determined by step 7), then the method loops back to step 3 and the quality comparison is repeated for a next mode. If the mode is the last one on the list, then the process continues to step 8 which determines whether there are any modes left on the list to consider (i.e. any modes that met the quality criteria of step 5). If not, then the mobile unit's access attempt is denied at step 9. If, however, there are modes remaining on the list, then the RF manager, at step 10, determines the mode k with the highest estimated quality.

Figures 5, 6:
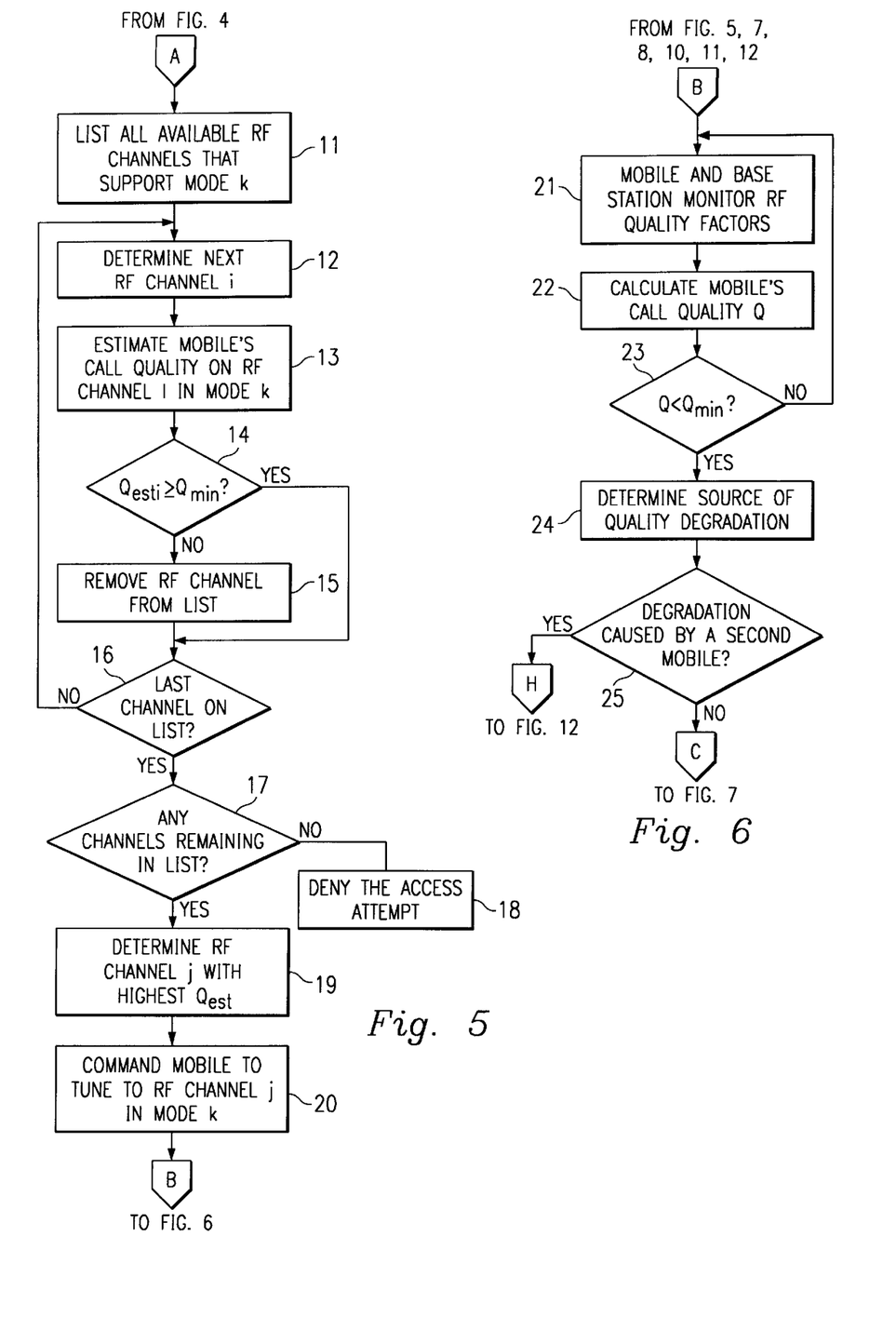
FIG. 5 is a flowchart showing steps associated with an initial channel allocation of a call in a mobile system in conjunction with an embodiment of the present invention.
FIG. 6 is a flowchart showing a method of monitoring active calls utilized by an embodiment of the present invention.

In step 11 of FIG. 5, all of the available RF channels that can support mode k are listed. At step 12, the process then determines the next RF channel i. The quality of the communication on RF channel i in mode k is then estimated at step 13. Using this criteria, step 14 determines whether the estimated call quality is greater than or equal to the minimum call quality. If the estimated quality is not greater than or equal to the minimum acceptable quality, then the RF channel being considered is removed from the list at step 15. Subsequent to step 15, and if it is determined that the estimated quality is greater than or equal to the minimum call quality, the process continues to step 16 where it is determined if this is the last RF channel on the list. If not, then the method loops back to step 12 and the comparison of RF channels in mode k continues. When step 16 determines that the last RF channel on the list has been considered, the process moves to step 17. In step 17, it is determined if there are any channels remaining on the list, i.e. were there any channels that met the quality criteria? If not, the access attempt is denied at step 18. When there are RF channels remaining on the list, the method of the present invention determines the particular RF channel j with the highest estimated quality (step 19). A control signal is then sent to the mobile unit that causes it to tune to RF channel j in mode k at step 20.

Subsequent to step 20, the process continues with step 21 of FIG. 6. In step 21, the mobile unit and base station monitor the RF communication quality factors. The RF manager then calculates the actual quality Q of the mobile unit at step 22 and step 23 then determines if the quality Q is less than the minimum acceptable quality level Q-min. If the quality is not less than the minimum quality threshold, then the process loops back to steps 21 and 22 and continues monitoring the actual quality. When the quality Q is less than the minimum acceptable level, then step 24 determines the source of the quality degradation. At step 25 the process determines if the degradation is caused by a second mobile unit.

Figure 7:
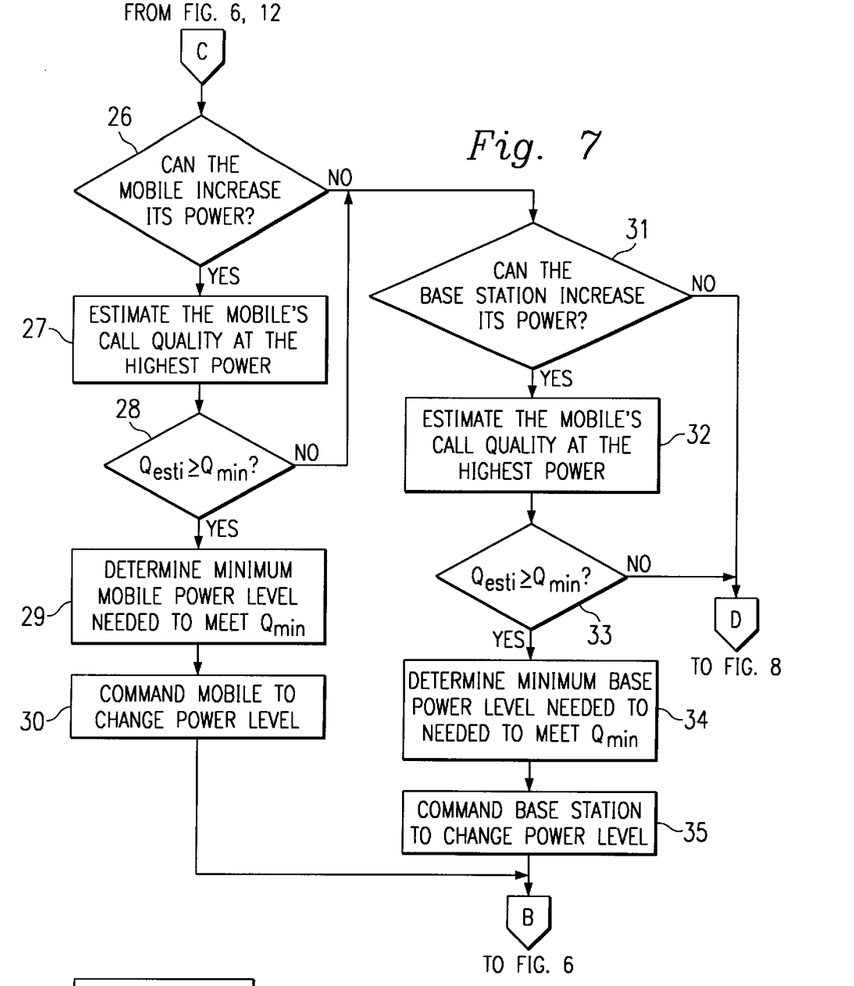
FIG. 7 is a flowchart of process steps implemented to manage power control of a mobile unit and base station according to an embodiment of the present invention.

Referring now to FIG. 7, if the source of degradation is not another mobile unit, then step 26 determines if the original mobile unit can increase its power. If so, the method at step 27 estimates the mobile's call quality at the highest power level. Step 28 determines if the estimated call quality at the higher power level is greater than or equal to the minimum acceptable quality Q-min. If so, then step 29 determines the minimum mobile power level needed to meet the quality criteria. Control signals are then generated by RF manager 18 and transmitted to mobile unit 10 via MSC 20, BSC 14 and BTS 12, causing the mobile unit to change its power to the level needed to meet the minimum quality threshold (step 30). It should be noted that one embodiment of the present invention causes the mobile unit to adjust its power level to meet, rather than exceed the minimum acceptable quality level in order to minimize any interference to other RF communications that could be caused by this power increase. In another embodiment, the mobile unit's power level is adjusted to exceed Q-min by at least one quality unit.

Returning to step 26, where if it was determined that the mobile unit cannot increase its power (i.e., the mobile unit already at the highest level), then step 31 determines if the base station can increase its power level. Further, if at step 28 it was determined that the estimated quality at the mobile unit's highest power level did not meet or exceed the minimum acceptable quality, then the method will also proceed to step 31. When it is determined at step 31 that the base station can increase its power (i.e., base station is not yet at its maximum power level), then step 32 estimates the mobile unit's call quality at the highest base station power level. At step 33, the estimated quality is compared with the minimum acceptable call quality of the communication and if the estimated quality is greater than or equal to the minimum quality, then the RF manager at step 34 determines the minimum base station power level needed to meet the quality criteria. Again, the minimum acceptable base station power is used to reduce any potential interference with other mobile units 10. Once, the minimum base station power level is determined at step 34, control signals are issued by the RF manager 18, via MSC 20, BSC 14 to BTS 12 (step 35).

Subsequent to both steps 30 and 35, the method of the present invention returns to step 21 of FIG. 6 where the mobile unit and base station monitor the quality factors of the RF communication.

Figure 8:
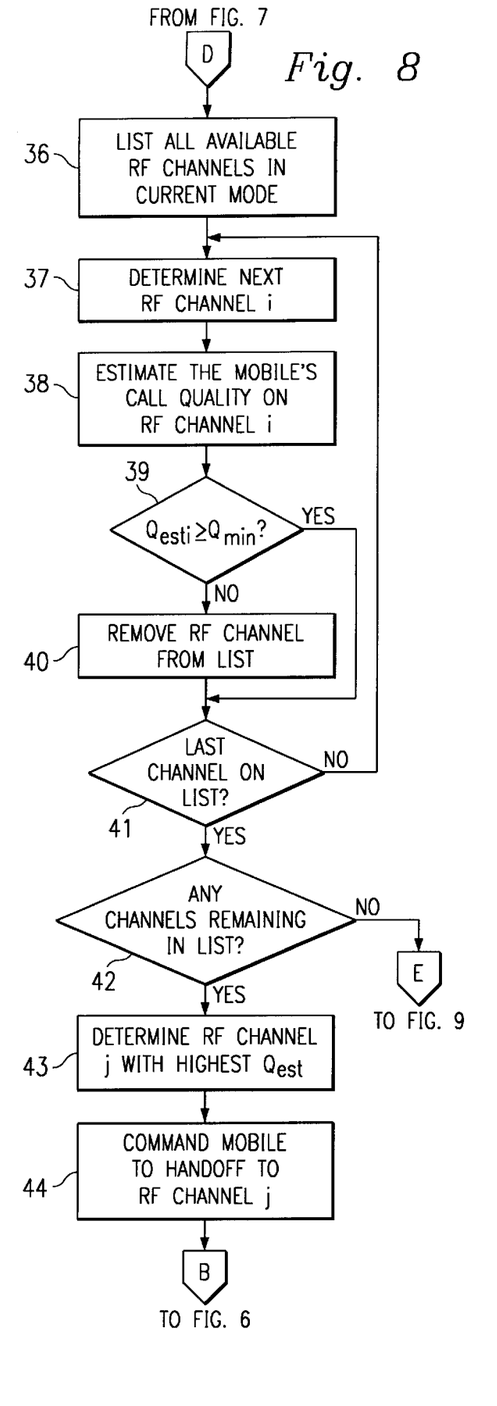
FIG. 8 is a flowchart illustrating steps of a handoff checks process according to an embodiment of the present invention.

If at step 31 of FIG. 7 it is determined that the base station is unable to increase its power level (i.e., base station is already at maximum power), the process continues to step 36 of FIG. 8. Further, if the estimated quality does not meet or exceed the minimum acceptable quality level for the RF communication in step 33 of FIG. 7, the process also continues to step 36 of FIG. 8. At step 36 the present invention builds a list of all of the RF channels available in the current mode. Step 37 then determines the next RF channel i and step 38 estimates the mobile unit's call quality on RF channel i. It is then determined if the estimated quality on channel i is greater than or equal to the minimum acceptable quality at step 38. If the estimated quality is not acceptable, then this RF channel is removed from the list at step 40. When the RF channel quality is greater than or equal to the minimum quality threshold, then the method proceeds to step 41 where it is determined if this is the last RF channel on the list. If not, the process loops back to step 37 where the next possible RF channel is evaluated. If, at step 41 it was determined that the RF channel considered is the last one on the list, then the process of the present invention continues to step 42 which determines if there are any channels remaining on the list. If so, then at step 43 the present invention determines the RF channel j from the list having the highest estimated quality. The RF manager then generates control signals that cause the mobile unit to be handed off to RF channel j which has the highest estimated quality as determined in step 43. After step 44, the process loops back to step 21 of FIG. 6 where the mobile unit and base station monitor the RF quality factors of the call.

Figure 9:
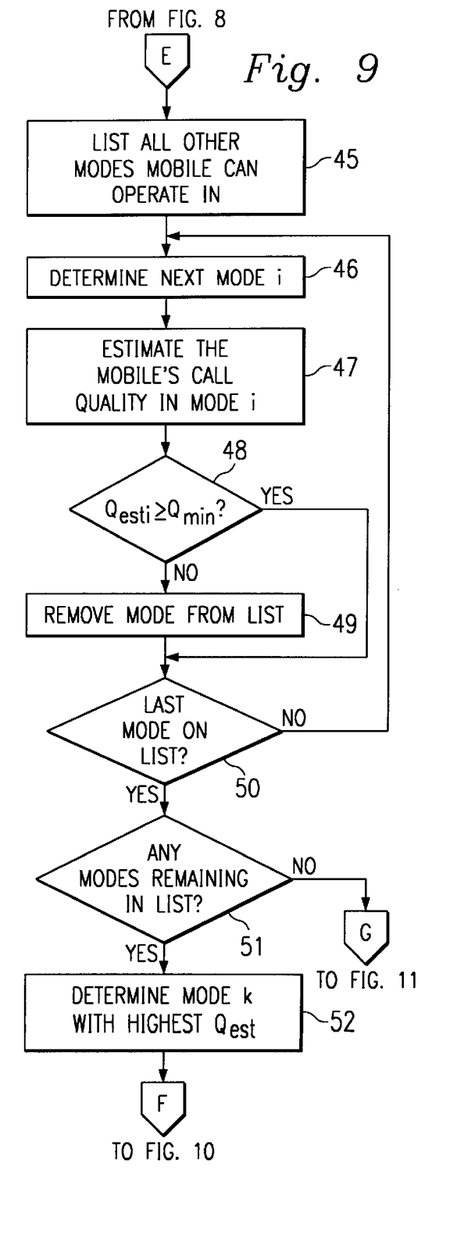
FIG. 9 is a flowchart showing steps of a mode change checks process implemented by an embodiment of the present invention.

If at step 42 of FIG. 8, it was determined that there are no RF channels on the list (i.e., none that would yield an estimated quality that meets the minimum standards), the process continues to step 45 of FIG. 9. In step 45, a list of all other modes under which the mobile unit can operate is built. Step 46 then determines the next mode i. The quality of the mobile unit's call in mode i is then estimated at step 47. It is then determined if the estimated quality is greater than or equal to the minimum acceptable call quality at step 48. If not, then step 49 removes this mode from the list. If the estimated quality does meet or exceed the minimum acceptable quality, then step 50 determines if this is the last mode on the list. If there are other possible modes to be evaluated on the list, then the process continues again to step 46. When the last mode on the list is reached, as determined by step 50, the method proceeds to step 51. In step 51, it is determined whether there are any modes left on the list (i.e., modes remaining that meet or exceed the quality threshold). If there are modes on the list which meet the threshold, then step 52 determines the mode k with the highest estimated quality.

Figure 10:
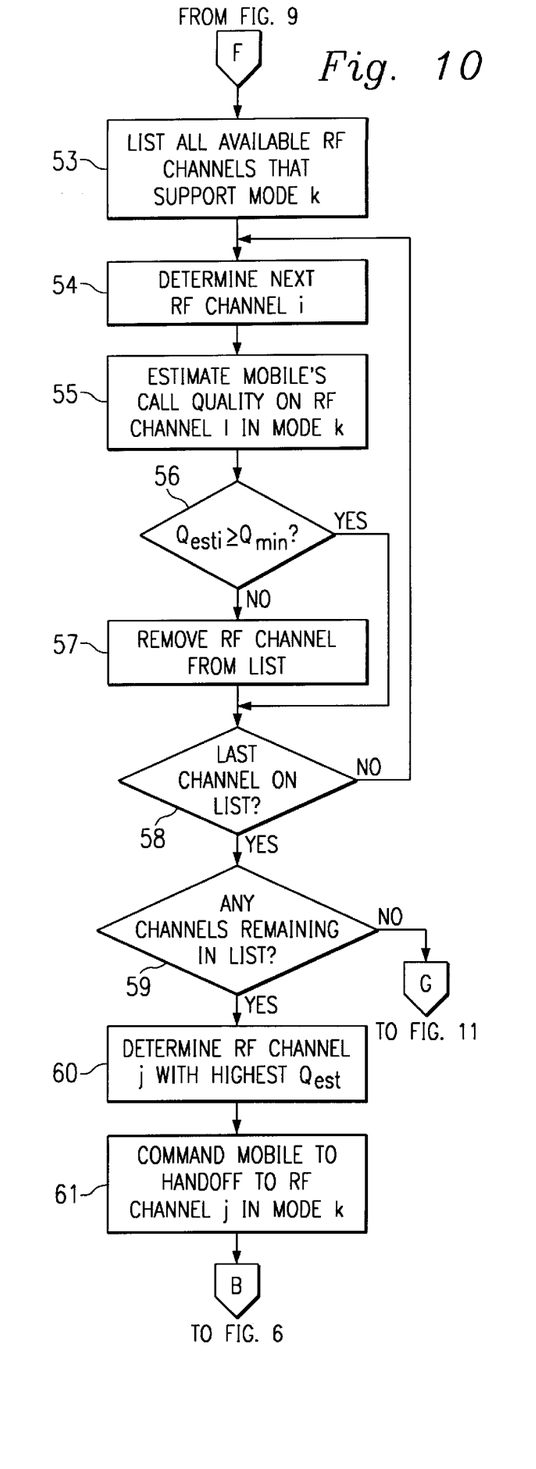
FIG. 10 is another flowchart of mode change handoff steps of an embodiment of the present invention.
Figure 11:
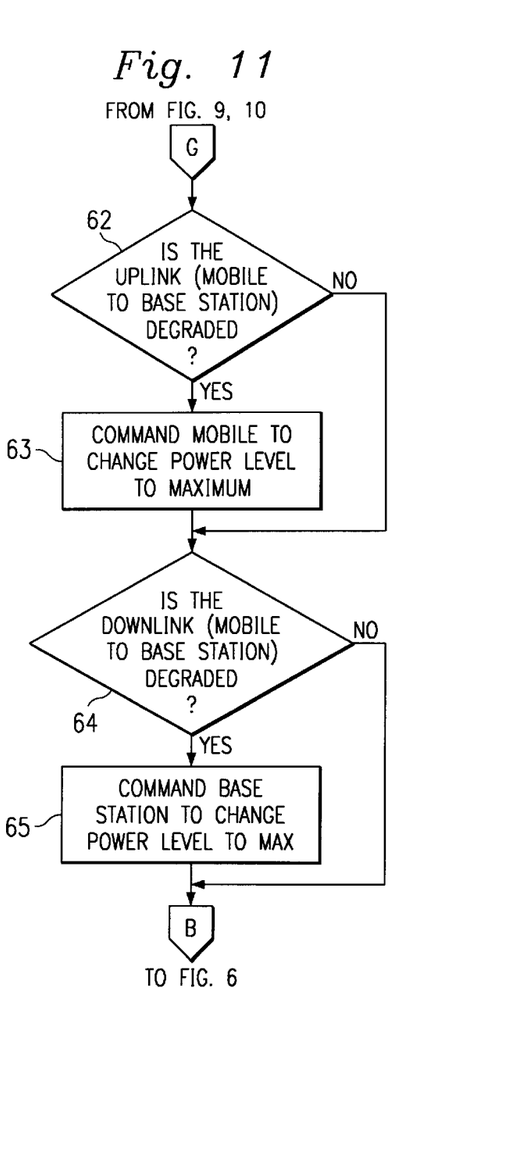
FIG. 11 is a flowchart showing steps taken when a call's parameters are unacceptable and no action is found to be sufficient to improve quality above the minimum acceptable value (Q-min)

When step 51 of FIG. 9 determines that there are no modes remaining on the list, the process continues to step 53 of FIG. 10. In step 53, all available RF channels that support mode k are listed. Step 54 then determines the next RF channel i. An estimate is then made by RF manager 18 of the quality of the mobile unit's call on RF channel i in mode k by step 55. It is then determined at step 56 if the corresponding estimated quality (step 55) is greater than or equal to the minimum acceptable call quality. If the estimated quality does not meet or exceed the threshold, then step 57 removes the RF channel from the list. However, if the estimated quality is at least equal to the minimum call quality standard, the process continues to step 58 which determines if this is the last RF channel on the list. If not, then the process loops back to step 54 to evaluate the next RF channel on the list. When the last RF channel has been encountered (step 58), then step 59 determines if there are any channels remaining on the list, i.e. are there any RF channels that meet the quality criteria. If so, then step 60 determines RF channel j from the list having the highest estimated quality. At step 61 RF manager 18 generates control signals that cause the mobile unit to be handed off to RF channel j in mode k. After step 61, the present invention loops to step 21 of FIG. 6 to continue monitoring the mobile unit and base station RF quality factors. When it is determined at step 51 of FIG. 9 that there are no modes remaining in the appropriate list, and it is determined at step 59 of FIG. 10 that no RF channels remain on that list, then the process continues to step 62 of FIG. 11.

At this point in the process, the various call parameters have been analyzed and varied to "tune" the system to its highest acceptable quality level. When there are no remaining options, such as alternate RF channels and/or modes to select (from steps 51 and 59) the present invention looks at the degradation of the uplink (mobile unit to base station) and downlink (base station to mobile unit). More specifically, step 62 determines if the uplink has been degraded. If so, the RF manager then causes the mobile unit to change its power to the maximum level (step 63). The process continues to step 64 when it is determined by step 62 that the uplink is not degraded, or subsequent to step 63. At step 64 it is determined if the downlink is degraded. If so, then the RF manager at step 65 causes the base station power level to be increased to its maximum output. When the downlink is not degraded, as determined by step 64, or after step 65 the method continues back to step 21 of FIG. 6 where the mobile unit and base station continue to monitor the call quality factors.

Figure 12:
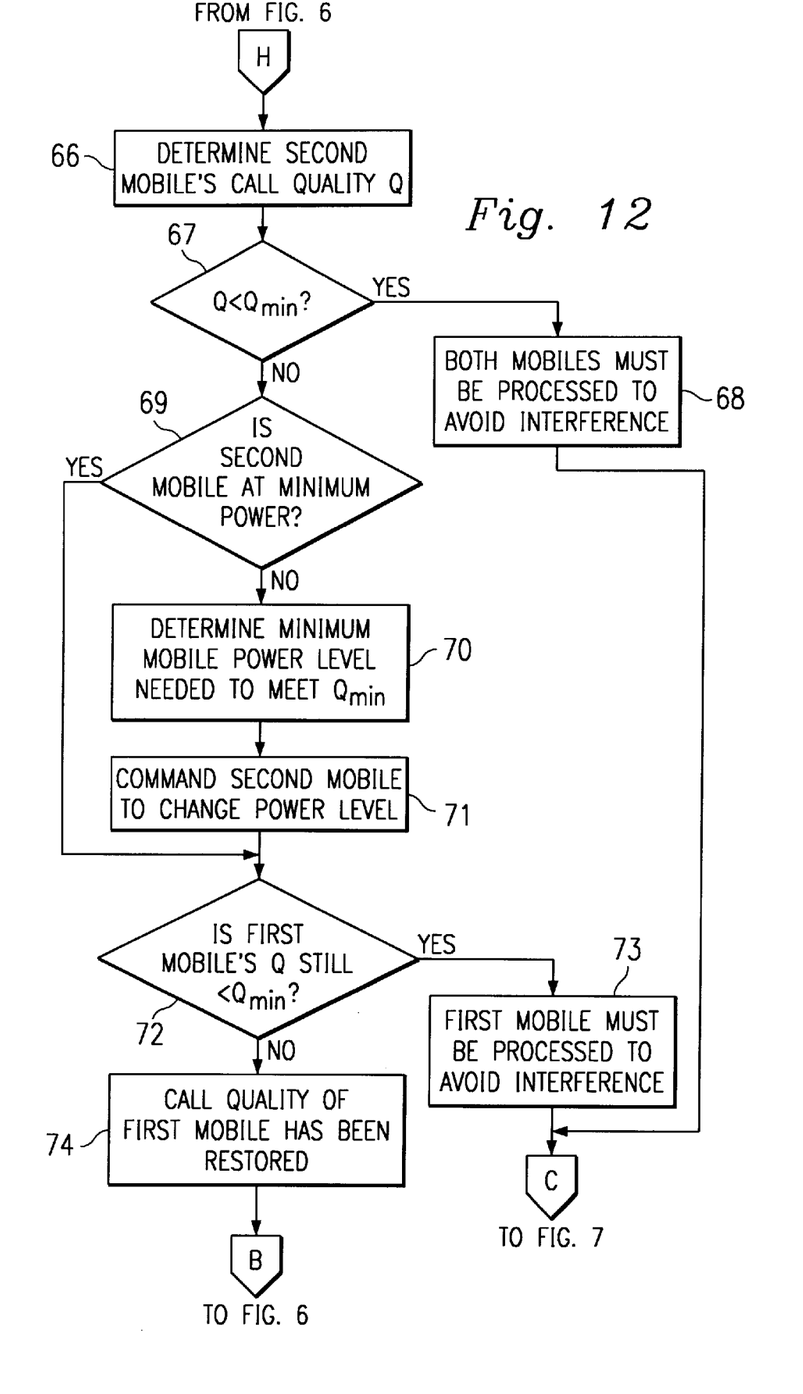
FIG. 12 is another flowchart of steps utilized by an embodiment of the present invention to remove an interfering call.

Referring now to FIG. 12, when it is determined at step 25 of FIG. 6 that the degradation of the communication between the mobile unit and the base station is caused by a second mobile unit, the process jumps to step 66 of FIG. 12. In step 66, the call quality Q of the second mobile unit's communication is determined. At step 67, it is then determined whether the call quality of the second mobile unit is less than the minimum acceptable quality. If so, then both the first and second mobile units must be processed to avoid interference (step 68). After step 68 of FIG. 12 the process loops back to step 26 of FIG. 7 which then begins the analysis of the call quality for both the first and second mobile units.

When it is determined at step 67 of FIG. 12 that the quality of the second mobile unit is not less than the minimum acceptable level, step 69 then determines if the second mobile unit is at minimum power (in order to reduce its interference with the first mobile unit). If the second unit is not at minimum power, then step 70 determines the minimum power level for the second mobile unit that will meet the quality threshold Q-min. At step 71, the RF manager causes the second mobile to change its power level to the minimum acceptable level as determined by step 70. Subsequent to step 70 and when step 69 determines that the second mobile is already at its minimum possible power level, step 72 then determines if the first mobile unit has a call quality that is still below the minimum acceptable quality threshold. If the first mobile unit's quality is still below the minimum, then at step 73 the first mobile unit must be processed to avoid the interference by looping back to step 26 of FIG. 7. When it is determined at step 72 of FIG. 12 that the quality of the first mobile now meets or exceeds the minimum acceptable quality, the quality of the first mobile has been restored (step 74) and the method continues back to step 21 of FIG. 6, where the mobile unit and base station quality factors are again monitored.

Thus, it can be seen that the present invention iteratively monitors and adjusts the parameters (mode, channel, power) for each call in the mobile telecommunications system to optimize its performance based upon the quality of each call therein.

A fundamental goal of assigning mobiles to channels and matching their respective power levels, handing off the mobiles from cell to cell, etc., the whole intent of that is, to maintain the quality of a call to at least a minimum acceptable quality level while maximizing the maximum number of calls that can be served in the cellular network. It is desired to use as many channels as possible, while still providing at least a minimal level of call quality for each mobile assigned to a channel. According to the present disclosure, the quality of a call is used as the criteria for deciding to take corrective action, in contrast with signal strength, error rate, etc. Instead, as long as the call is of a minimal level of quality, then no action is taken with respect to the call and RF channel management.

The present embodiments function based upon a quality oriented parameter. With the quality parameter, an amount of effort needed to process mobile calls and to manage the RF channels is advantageously minimized.

Principals of the present embodiments include; 1) ensure that a minimum level of call quality is maintained, as established by the cellular network operator; 2) keep interference down to a minimum so that each mobile call has a higher probability of having an acceptable call; and 3) utilize a minimum amount of processing on the cellular network. Without the present embodiments, managing of RF channels can become a significant engineering problem.

The present embodiments make use of certain physical characteristics or available measurements which can be made on the mobile station and a corresponding base station relative to whether or not the call is "good" or "not good". For example, C/I, BER, FER, muting characteristics, etc., directly affect the level of quality of a given cellular call. Other characteristics may have a correlated influence to the level of quality of the given cellular call, but don't necessarily themselves give an indication that a given call is "good" or "not good". For example, the received signal strength indicator (RSSI) is such a characteristic. A call may have a low RSSI and still a good sounding call results if there is no interference. RSSI is a typical trigger for implementing a handoff, (i.e., when the RSSI is low, move the call to a new BTS), even though the call quality may not be bad. Such usage of RSSI to implement handoff initiation results in unnecessary processing in the network.

With the use of call quality as the measurement characteristic, unnecessary RF channel management has been minimized. Unnecessary work is advantageously avoided.

When something must be done (i.e., action taken to maintain a minimum level of call quality), then the present embodiment provides for selecting an RF channel adjustment or change which does not interfere with any other active call and furthermore will yield an adjustment or change which provides for a maximized duration before a subsequent change becomes necessary. In the first instance, change is avoided when unnecessary. In the latter instance, when change is required, then a best change that can be made is carried out so that a subsequent change will not be needed for a longer duration. That is, changes are not being continuously made to the RF channel assignments in the cellular system.

There are several changes that can be implemented with respect to a mobile. They include placing a mobile onto a particular channel, either when the call is initiated or as part of a handoff. The mobile can be moved to a different frequency. The power level of the mobile can be changed. In addition, the power level of the base station can be changed, which possibly effects a level of interference. Furthermore, the coder used for voice coding can be changed for the call, under certain circumstances (i.e., changing the call mode). Handoff is the primary activity used to resolve quality problems, however, the other changes will also have an impact.

The present embodiments postulate an ability to measure and/or estimate the quality of a particular call under various circumstances. In a particular measurement situation that a given call is in, there is derived a Q-factor (a quality factor)

which establishes a criteria for deciding whether or not the given call is good enough or not. As a function of the measurement taken, the quality of a call is estimated and/or determined and an appropriate corrective action taken. Unacceptable is defined as lower power levels which result in quality below a minimum quality level. Good is defined as a power level having a quality above a minimum quality level. Marginal is defined as a power level having a quality at the minimum quality level.

In situations where all prescribed changes have been investigated and none appear suitable, then the power level of the mobile is adjusted accordingly. The system then awaits a next opportunity for improving upon the call quality. RF shall refer herein to the set of radios (radio transceivers) in a particular base station. RF management shall refer to management of the radios used in the cellular system.

The present embodiments utilize some form of control on both sides of a radio link. That is, some aspects of the mobile station can be controlled and some aspects of the base station can be controlled, as discussed herein. The RF manager is thus involved in a management of both an up link and a down link, i.e., the forward and reverse channels.

The present embodiments deal with the management of the RF interface in a cellular system, in particular, the mobiles and the base stations. Communications are established both to the radio transceivers in the base station and the mobiles themselves in order to manage the RF environment.

FIGS. 13, 14, 15, and 16 shall now be briefly discussed. Each figure shows an estimated impact to the quality of a call in response to changing one of four parameters in a cellular network or system. The parameters include mobile power, base station power, channel, and mode. The integration of the FIGS. 13, 14, 15, and 16 yields a Q-map, such as shown in FIG. 17.

The flowcharts provide illustration of a trade-off between the "best" solution to a quality problem and the impact to the cellular network system. The Q-map identifies what the best solution is and can also be used to provide input into the processing steps as discussed above. In effect, each slice of the Q-map (i.e., along the x, y, or z coordinate axis from the mobile's current state) provides a solution for each of the "checks" stages in the flowcharts. If the Q-map is kept current, then execution of the process outlined in the flowcharts is very fast and highly desirable.

Figure 13:
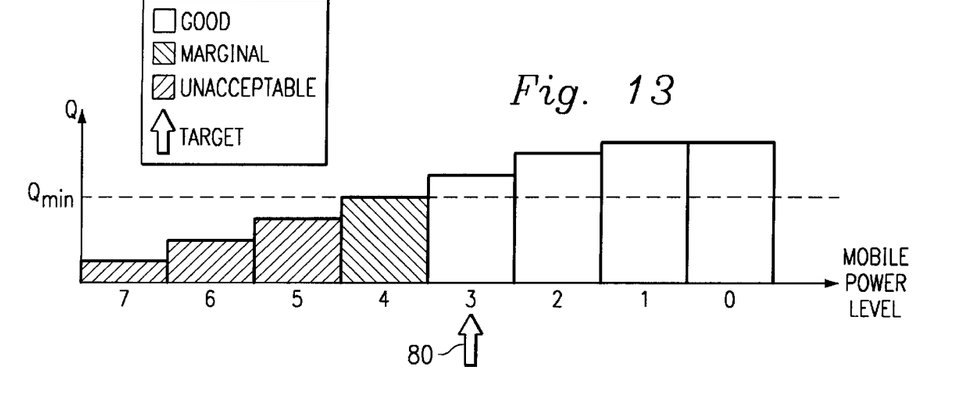
FIG. 13 is a graphical view of quality versus power level of a mobile.

Referring briefly to FIG. 13, a plot of quality versus mobile power level is shown for a given mobile at a given instant of time. From the Figure, it can be noted that increasing the mobile's power level allows the mobile to overcome reverse channel interference and fades. The target power level 80 is chosen such that it is the lowest power level which maintains the reverse channel at Q-min. Mobile power level changes have the least impact on the cellular network system.

Figure 14:
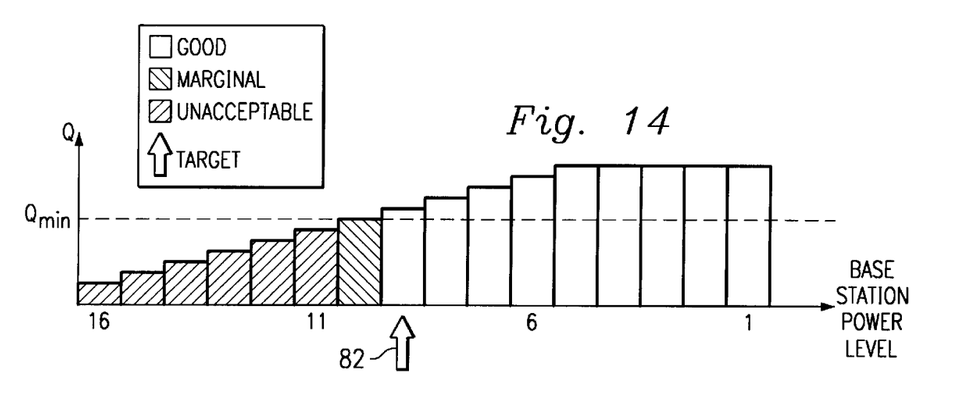
FIG. 14 is a graphical view of quality versus base station power level.

Referring now to FIG. 14, a plot of quality versus base station power level is shown for a given call at a given instant of time. From the Figure, it can be noted that increasing the base station's power level allows it to overcome forward channel interference and fades. The target power level 82 is selected such that it is the lowest power level which maintains the forward channel at Q-min. Base station power level changes may impact other calls in the system.

Figure 15:
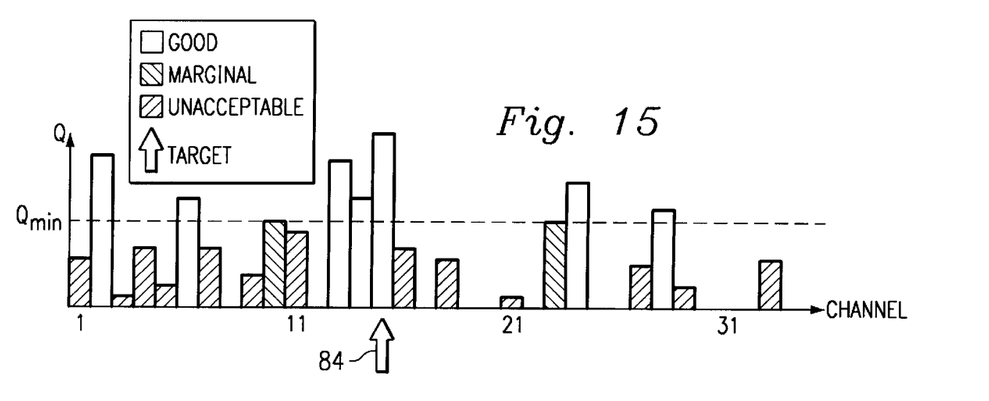
FIG. 15 is a graphical view of quality versus channel assignment.

With reference now to FIG. 15, a plot of quality versus channel assignment is shown for a given call at a given instant of time. From the Figure, it can be noted that moving a mobile to a new channel allows it to avoid interference, fades, and other impairments. The target channel 84 is selected such that it provides the greatest quality improvement to the call's quality for a given power level. Moving mobiles between channels is carried out on a limited basis, since moving mobiles between channels is expensive and time consuming.

Figure 16:
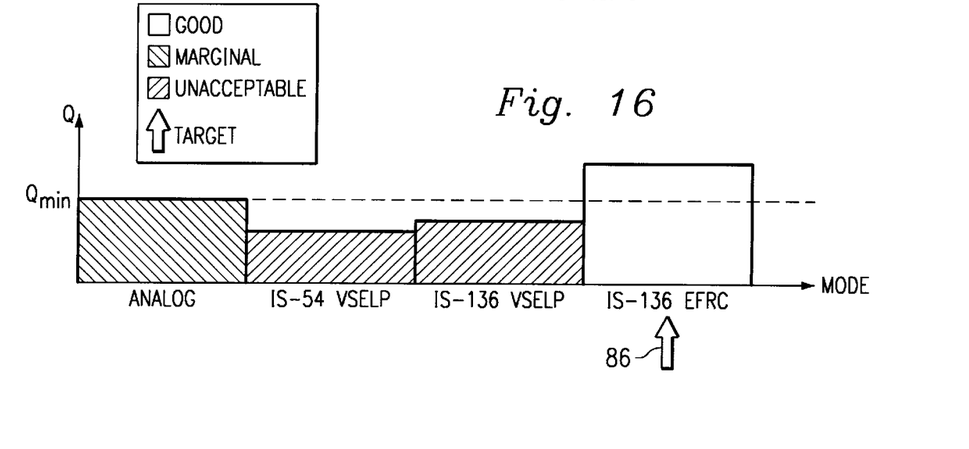
FIG. 16 is a graphical view of quality versus call mode.
Figure 17:
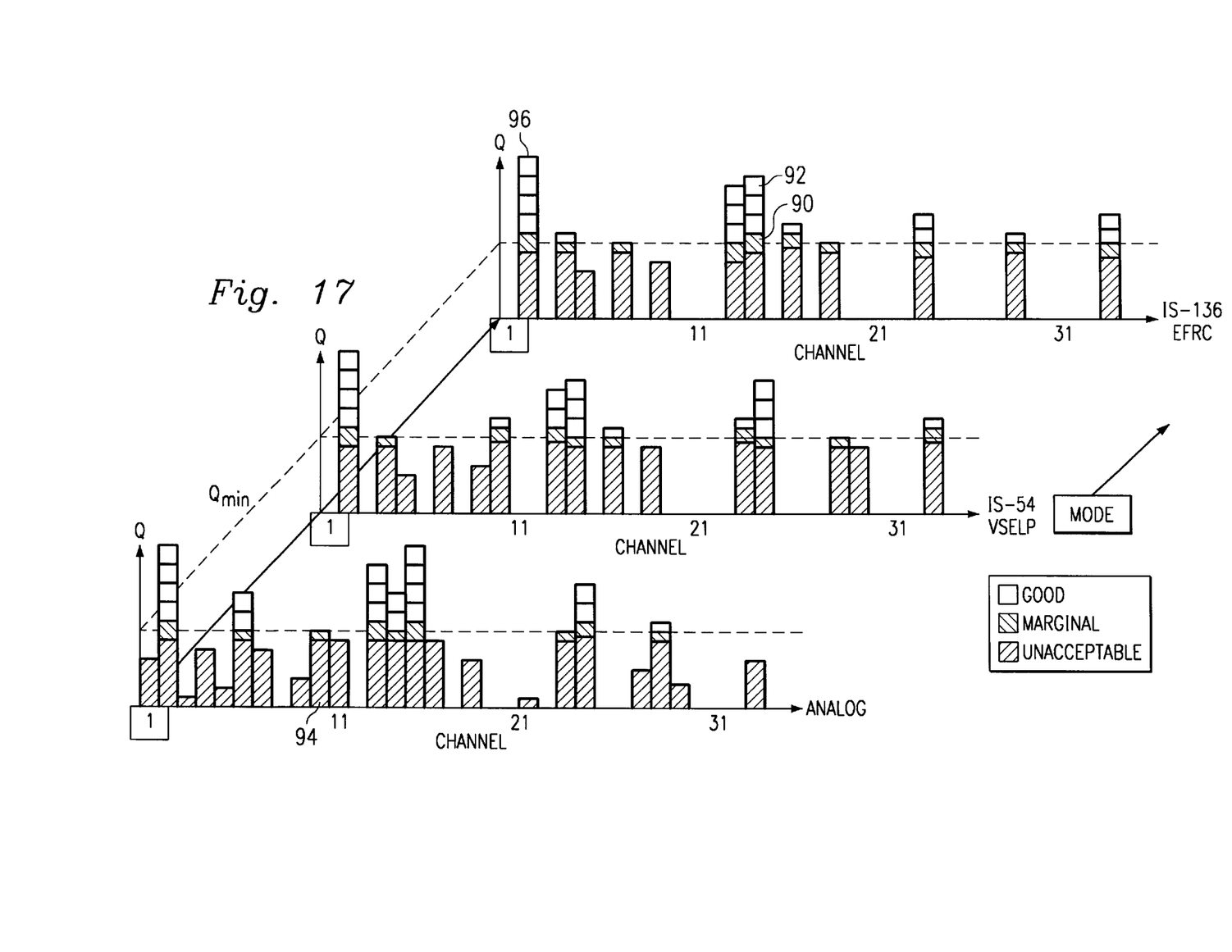
FIG. 17 is a graphical representation view of a quality map of the RF parameters for a call of a mobile in the cellular network managed in accordance with an embodiment of the present invention.

Turning now to FIG. 16, a plot of quality versus call mode is shown for a given mobile call at a given instant of time. Changing a mobile's call mode allows the mobile to use a technology better suited for its environment. The target mode 86 should be selected to provide the greatest improvement for a given power level. Changing call modes has the greatest impact on system resources.

FIG. 17 is a graphical representation of the quality map utilized by the present invention to evaluate call quality in a mobile telecommunications system. If considered as an x, y, z coordinate system, the x axis is the RF channel assignment with the y axis being the available mode of operation. Quality levels are shown as the z axis with a shaded level noting the minimum acceptable quality level Q-min which was assigned by the cellular network system operator. The Q-map provides a logical representation of the RF management options available to a mobile at any point in time. Every active call will have a unique Q-map, identifying the set of all available channels, modes, and respective quality estimates at a given set of power levels.

For example, it can be seen that for the given instant of time, the analog call on channel 11 has just slipped below the quality threshold. In accordance with the previous discussion, the power (mobile and base) can be increased, or a different mode or channel selected. The quality map of FIG. 17 shows, in an easy to understand manner, how any given call in the cellular network system can be monitored and adjusted to reach the optimum level of call quality, while minimizing any interference that may be caused by the adjustments.

To further illustrate, assume that FIG. 17 represents a particular mobile on channel 14 in IS-136 mode. Since changing channels and modes is expensive, a mobile should remain on its current channel as long as possible. At a present instant in time, the mobile on channel 14 in IS-136 mode is at a marginal level of quality as indicated by reference numeral 90. A preferred corrective action would be to increase the power level of the mobile (and/or base station) to achieve an estimated good quality level as indicated by reference numeral 92.

In another example, using the Q-map of FIG. 17, a mobile in the analog mode is on channel 10 (indicated by reference numeral 94). From FIG. 17, it is noted that the call quality is marginal. At any point in time, the mobile is preferably on the channel that offers the best quality at the lowest power level. The mobile on channel 10 in the analog mode should be moved to the IS-136 EFRC mode on channel 2, as indicated by reference numeral 96.

The Q-map thus provides a logical representation of the RF management options available to a mobile at a given point in time. Every active call will have a unique Q-map identifying the set of all available channels, modes, power levels, and their respective quality estimates. Because wireless systems are very dynamic, the Q-map for any particular mobile will vary over time. In one embodiment, a new Q-map is generated whenever a mobile's quality assessment falls into or within the "marginal" range. Alternatively, in another embodiment, a Q-map can be continuously maintained for each active mobile in the system, based on call parameters periodically sent from the BTS and the mobile.

The embodiments of the present invention also monitor various call parameters, such as signal strength and interference. The embodiments then correspondingly adjust call variables, such as power level, mode and channel assignment in accordance with the measured criteria to meet a predetermined quality threshold for each call in the system utilizing a corresponding Q-map.

Although certain preferred embodiments have been shown and described, it should be understood that many changes and modifications may be made therein without departing from the scope of the appended claims.

What is claimed is:

1. A method of managing RF communications between at least one mobile unit and a base station in a mobile telecommunications system, said method comprising the steps of:

setting a threshold minimum level of call quality (Q-min) for said RF communications;

measuring a call quality value (Q-value) of a prescribed call of said RF communications;

comparing said call quality value with said threshold minimum quality value; and dynamically managing radio frequency channels of said RF communications in said mobile telecommunications network as a function of said call quality value and said minimum level of call quality, wherein dynamically managing radio frequency channels includes generating a quality map (Q-map) of said mobile telecommunications network for each said at least one mobile station during the prescribed call at a particular point in time, the quality map including an estimate of a quality of service said at least one mobile station would receive on each available RF channel in each available mode at each available power level.

2. The method according to claim 1 wherein said step of dynamically managing radio frequency channels further includes adjusting at least one of the following plurality of parameters selected from the group consisting of:

raising a transmission power parameter of said mobile unit;

raising a transmission power parameter of said base station;

changing a frequency parameter of said RF communication; and changing a mode parameter of said RF communication.

3. The method according to claim 2 wherein said step of dynamically managing radio frequency channels still further includes:

raising said transmission power parameter of said mobile unit;

checking said call quality value against said threshold minimum quality value; and maintaining said plurality of parameters when said call quality value is greater than said threshold minimum quality value.

4. The method according to claim 2 wherein said step of dynamically managing radio frequency channels still further includes:

raising said transmission power parameter of said base station;

checking said call quality value against said threshold minimum quality value; and maintaining said plurality of parameters when said call quality value is greater than said threshold minimum quality value.

5. The method according to claim 4 wherein said step of dynamically managing radio frequency channels still further includes:

changing said frequency parameter of said RF communication;

checking said call quality value against said threshold minimum quality value; and maintaining said plurality of parameters when said call quality value is greater than said threshold minimum quality value.

6. The method according to claim 5 wherein said step of dynamically managing radio frequency channels still further includes:

changing said mode parameter of said RF communication;

checking said call quality value against said threshold minimum quality value; and maintaining said plurality of parameters when said call quality value is greater than said threshold minimum quality value.

7. The method according to claim 2 wherein said step of dynamically managing radio frequency channels still further includes:

determining a predicted quality value for said RF communication which is generated by sequentially substituting variable parameters for said plurality of parameters; and changing any one of said plurality of parameters when said predicted quality value is greater than said threshold minimum quality value.

8. A method of managing RF communications between at least one mobile unit and a base station in a mobile telecommunications system, said method comprising the steps of:

setting a threshold minimum quality value for said RF communications;

measuring a call quality value of a prescribed call of said RF communications;

comparing said call quality value with said threshold minimum quality value;

dynamically managing radio frequency channels of said RF communications in said mobile telecommunications network as a function of said call quality value and said threshold minimum level of call quality, wherein dynamically managing radio frequency channels includes generating a quality map (Q-map) of said mobile telecommunications network for each said at least one mobile station during the prescribed call at a particular point in time, the quality map including an estimate of a quality of service said at least one mobile station would receive on each available RF channel in each available mode at each available power level, wherein dynamically managing includes adjusting at least one of a plurality of parameters relating to said RF communication when said call quality value is less than said threshold minimum quality value;

determining a predicted quality value for said RF communication which is generated by sequentially substituting variable parameters for said plurality of parameters; and changing any one of said plurality of parameters when said predicted quality value is greater than said threshold quality value.

9. The method according to claim 8 wherein adjusting at least one of a plurality of parameters comprises one of the following selected from the group consisting of:

raising a transmission power parameter of said mobile unit;

raising a transmission power parameter of said base station;

changing a frequency parameter of said RF communication; and changing a mode parameter of said RF communication.

10. A cellular network having an RF management capability comprising:

a mobile switching center;

at least one base station controller operatively coupled to said mobile switching center;

at least one base station operatively coupled to said at least one base station controller;

at least one mobile station operatively coupled to said at least one base station for carrying out a prescribed call; and a radio frequency manager operatively coupled to said at least one base station and said at least one mobile station for dynamically managing radio frequency channels in said cellular network as a function of a call quality value (Q-value), and more particularly, a minimum level of call quality (Q-min), such that an overall quality of service provided by said cellular network is improved, wherein dynamically managing radio frequency channels by said radio frequency manager includes generating a quality map (Q-map) of said system for each said at least one mobile station during the prescribed call at a particular point in time, the quality map including an estimate of a quality of service said at least one mobile station would receive on each available RF channel in each available mode at each available power level.

11. The network of claim 10, wherein the minimum level of call quality (Q-min) corresponds to a minimum call quality level as determined by an operator of said cellular network.

12. The network of claim 10, wherein available modes include analog and digital modes.

13. The network of claim 10, wherein said RF manager creates and updates the quality map (Q-map) based upon prescribed information available from said system.

14. The network of claim 13, wherein the prescribed information includes at least one of the following selected from the group consisting of signal strength measurements, interference, and call activity.

15. The network of claim 10, wherein said RF manager searches the quality map (Q-map) of a respective mobile station for a highest channel/mode/power level combination for restoring a minimum level of quality upon a determination that the Q-value of a respective said at least one mobile station falls below the minimum acceptable quality level (Q-min).

16. The network of claim 10, wherein said RF manager operates to restore a minimum level of quality upon a determination that the Q-value of a respective said at least one mobile station falls below the minimum acceptable quality level.

17. A cellular network having an RF management capability comprising:

a mobile switching center;

at least one base station controller operatively coupled to said mobile switching center;

at least one base station operatively coupled to said at least one base station controller;

at least one mobile station operatively coupled to said at least one base station for carrying out a prescribed call; and a radio frequency manager operatively coupled to said at least one base station and said at least one mobile station for dynamically managing radio frequency channels in said cellular network as a function of a call quality value (Q-value), and more particularly, a minimum level of call quality (Q-min), such that an overall quality of service provided by said cellular network is improved, wherein dynamically managing radio frequency channels by said radio frequency manager includes generating a quality map (Q-map) of said system for each said at least one mobile station during the prescribed call at a particular point in time, the quality map including an estimate of a quality of service said at least one mobile station would receive on each available RF channel in each available mode at each available power level wherein each of said at least one mobile stations is assigned a Q-value representative of a current quality of service of a respective said at least one mobile station, further wherein said RF manager operates to adjust prescribed parameters in connection with more than one call by said at least one mobile station upon an occurrence and detection of an interference between two mobile stations.

18. The network of claim 17, further wherein said RF manager operates to restore a minimum level of quality upon a determination that the Q-value of a respective said at least one mobile station falls below the minimum acceptable quality level.

19. A cellular network having an RF management capability comprising:

a mobile switching center;

at least one base station controller operatively coupled to said mobile switching center;

at least one base station operatively coupled to said at least one base station controller;

at least one mobile station operatively coupled to said at least one base station for carrying out a prescribed call; and a radio frequency manager operatively coupled to said at least one base station and said at least one mobile station for dynamically managing radio frequency channels in said cellular network as a function of a call quality value (Q-value), and more particularly, a minimum level of call quality (Q-min), such that an overall quality of service provided by said cellular network is improved, wherein dynamically managing radio frequency channels by said radio frequency manager includes generating a quality map (Q-map) of said system for said at least one mobile station during the prescribed call at a particular point in time, the quality map including an estimate of a quality of service said at least one mobile station would receive on each available RF channel in each available mode at each available power level, wherein said RF manager creates and updates the quality map (Q-map) based upon prescribed information available from said system, wherein the prescribed information includes at least one of the following selected from the group consisting of signal strength measurements, interference, and call activity, and wherein said RF manager searches the quality map (Q-map) of a respective mobile station for a highest channel/mode/power level combination for restoring a minimum level of quality upon a determination that the Q-value of a respective said at least one mobile station falls below the minimum acceptable quality level (Q-min).

* * * * *